Jan. 12, 1960  L. E. KAAP  2,920,552
APPARATUS FOR STERILIZING PRODUCTS IN SEALED CONTAINERS
Filed Aug. 3, 1955  6 Sheets-Sheet 5

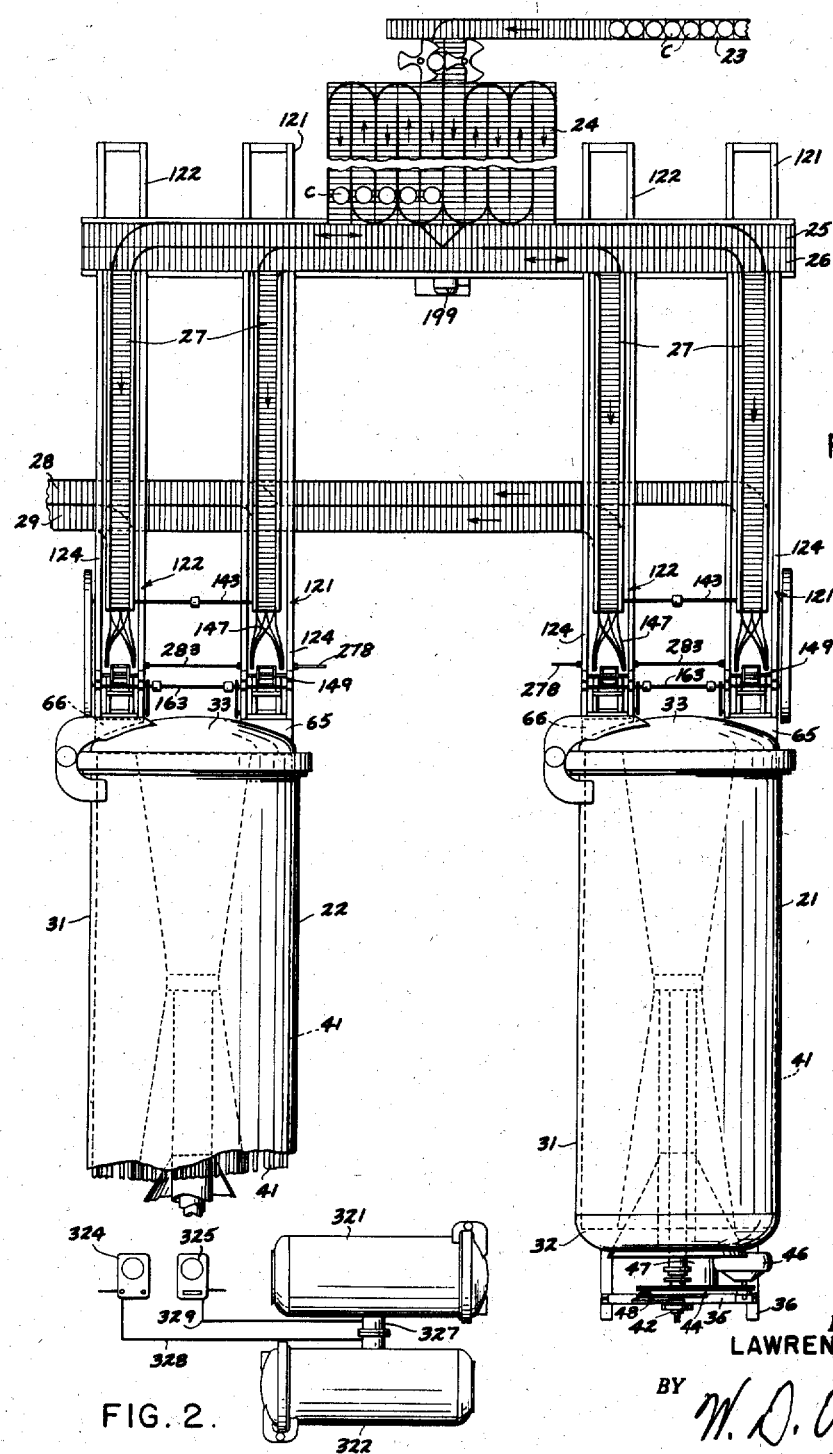

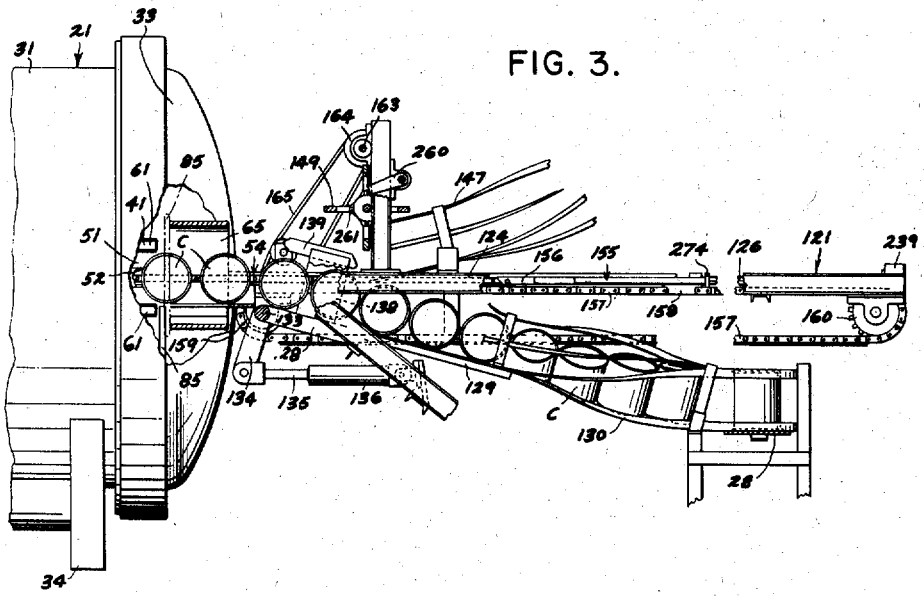

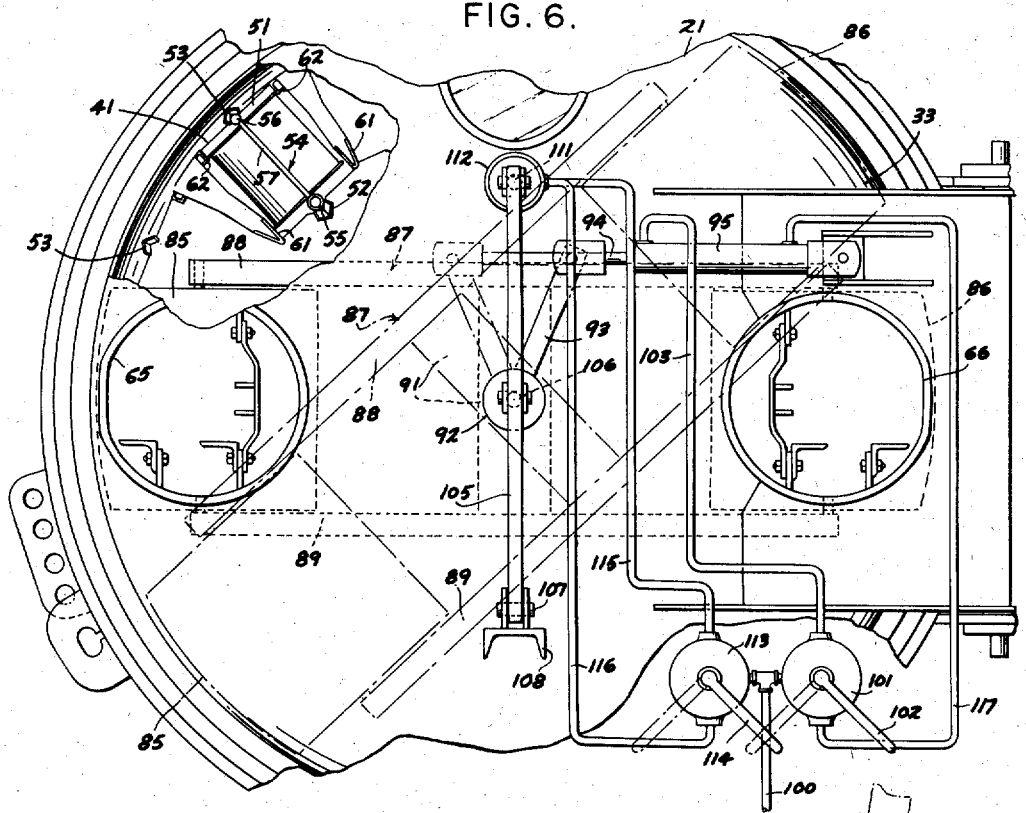
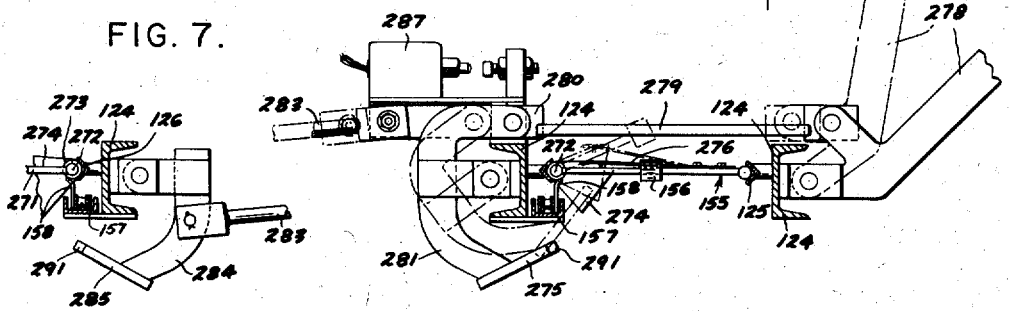
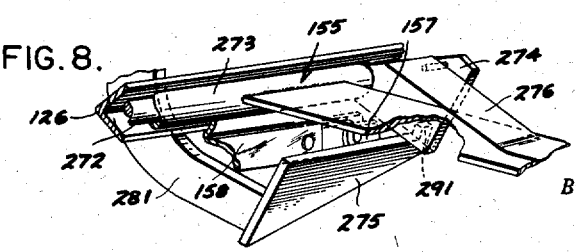

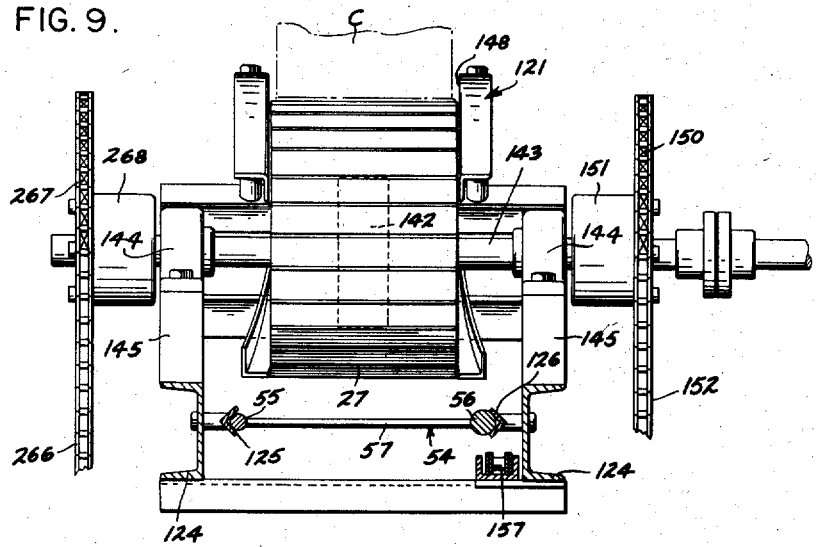
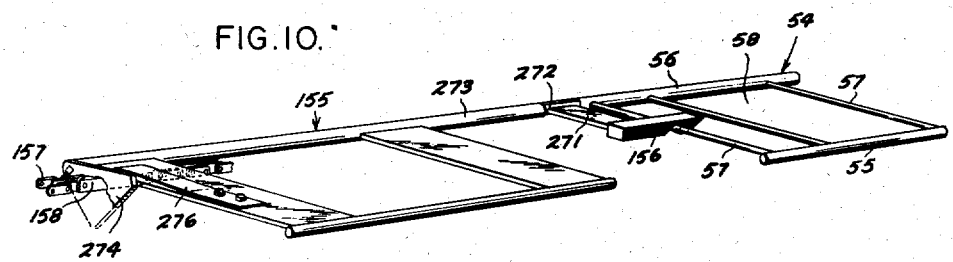
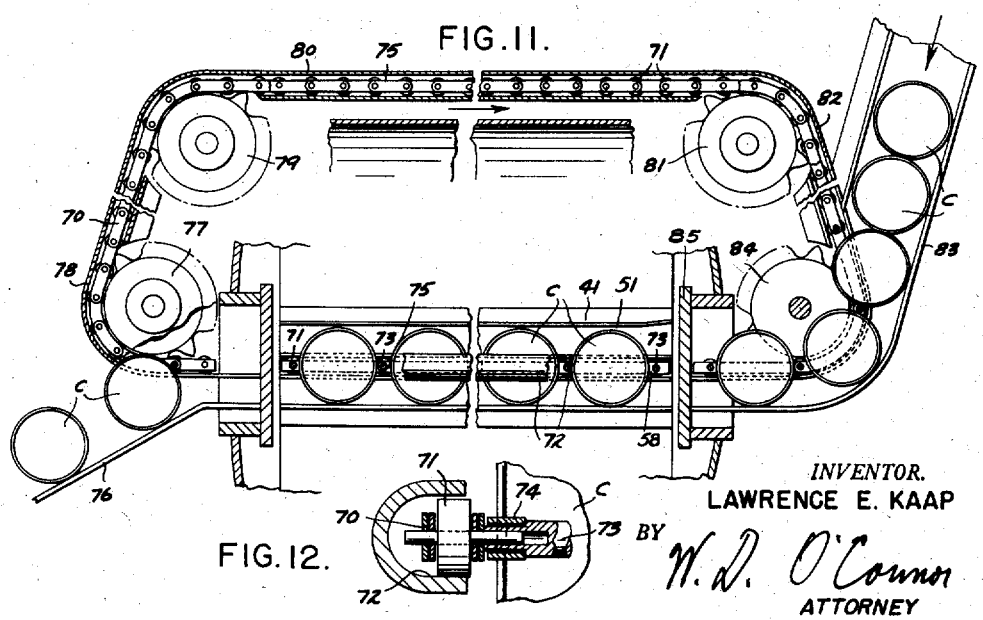

INVENTOR.
LAWRENCE E. KAAP
BY
ATTORNEY

Jan. 12, 1960         L. E. KAAP         2,920,552
APPARATUS FOR STERILIZING PRODUCTS IN SEALED CONTAINERS
Filed Aug. 3, 1955         6 Sheets-Sheet 6

INVENTOR.
LAWRENCE E. KAAP
BY *M. D. O'Connor*
ATTORNEY

United States Patent Office 2,920,552
Patented Jan. 12, 1960

2,920,552

APPARATUS FOR STERILIZING PRODUCTS IN SEALED CONTAINERS

Lawrence E. Kaap, Studio City, Calif., assignor, by mesne assignments, to Food Machinery and Chemical Corporation, San Jose, Calif., a corporation of Delaware Application August 3, 1955, Serial No. 526,263

19 Claims. (Cl. 99—371)

This invention relates generally to the art of processing comestibles and like material confined in sealed containers and more particularly to improved apparatus for loading containers into and unloading them from sterilizing equipment of the agitating type.

In my copending application filed October 28, 1953, Serial No. 388,747, which issued December 17, 1957 as Patent No. 2,816,841, new methods and improved apparatus are disclosed for achieving rapid processing of material sealed in containers. As therein set forth, these new methods and apparatus are particularly adapted for use in accordance with the material processing method described in U.S. Patent No. 2,517,542, issued August 8, 1950, to LaVerne E. Clifcorn, et al.

In practicing the method disclosed in the Clifcorn et al. patent, sealed containers of material packed in liquid and provided with head space are revolved end-over-end in a retort containing heat transferring medium at a speed of revolution selected to cause the head space bubble in each container to move through the contents in a manner to stir the liquid thereby facilitating heat transfer between the liquid and the container walls. In my Patent No. 2,816,841 I have disclosed apparatus for processing material in accordance with the Clifcorn et al. patent wherein containers of material are loaded side by side in long baskets that are inserted in slots in the periphery of a rotor mounted in a retort. The rotor with its load of baskets is arranged to be revolved within the retort in a manner to turn the containers end-over-end for effecting optimum agitation of the liquid contents while subjected to the processing effect of heat transferring fluid in the retort.

It is a general object of the present invention to provide improved sterilizing apparatus for processing material in sealed containers, especially in accordance with the processing method involving end-over-end agitation.

Another object of the invention is to provide improved apparatus for feeding containers of material into and discharging them from a processing retort in proper sequence while preventing inadvertent discharging of unprocessed containers.

Another object is to provide improved apparatus for retaining containers in a rotor for end-over-end sterilizing including improved container moving racks for advancing a row of containers into or withdrawing them from the rotor trackways.

Another object is to provide an improved loading and unloading apparatus for the rotor of an agitating retort arranged to operate on two diametrically opposed rows of containers simultaneously to maintain the rotor in balance.

Another object is to provide improved indexing apparatus and control mechanism therefore arranged to automatically index the rotor of an agitating sterilizer for unloading and loading successive rows of containers expeditiously.

Another object is to provide improved control apparatus for the rotor of a sterilizer including interlocks arranged to prevent simultaneous loading and indexing and to prevent operation of the loading mechanism while the rotor is rotating.

In accordance with this invention, an agitating sterilizer of the rotary type is provided with improved arrangements for loading and unloading the retort rotor in a manner to expedite the processing operation. To this end the rotor or reel is provided with a series of longitudinal container receiving openings constituting slots or trackways distributed about its periphery and arranged to retain rows of containers filled with material being processed. One end of the retort containing the rotor is provided with two small doorways disposed horizontally and arranged to be in alignment with two of the rotor slots when they are positioned on a horizontal diameter of the rotor at opposite sides of its axis. By this arrangement two opposed rotor slots may be loaded simultaneously to maintain balance in the rotor and to expedite the loading operation. Each slot in the rotor is slidably fitted with a ladder like container moving and spacing rack so arranged that containers positioned between cross members of the ladder may be rolled on their heads into or out of the rotor slot. When a ladder rack is withdrawn through one of the doorways, the containers therein drop from between the cross members into a discharge chute. As the ladder is moved back into the slot, fresh containers of material to be processed are fed into the spaces between the cross members from an overhead conveyer. After the processed containers in the two diametrically opposed slots have been removed and replaced by unprocessed containers, the rotor is automatically indexed by means of improved indexing mechanism to present another pair of slots at the doorways. By this arrangement the rotor may be maintained in substantial balance at all times as the successive pairs of slots are unloaded and reloaded. Power operated mechanism is provided for moving the ladder like racks out of and into the rotor and for delivering containers to and carrying them away from the racks. The power operated mechanism is fitted with control apparatus whereby the loading and indexing operations occur in the proper sequence and unloading of unprocessed containers is prevented. Furthermore, operation of the loading apparatus and the indexing mechanism or the processing apparatus simultaneously is prevented by interlocking control mechanism. The container moving racks may be in the form of rigid ladders or may be formed by flexible chain-like conveyers moving in guides in the rotor slots. Preferably, two retorts are operated together in order that one may be processing while the other is being loaded, or if desired, processing may be effected in both retorts simultaneously in which event a single process controlling system may be arranged to serve both retorts.

The foregoing and other objects of this invention will become more fully apparent as the following detailed description of improved sterilizing apparatus constituting exemplary embodying structure is read in conjunction with its representations in the accompanying drawings, wherein:

Figure 1 is a diagrammatic over-all plan view of an improved processing apparatus including two sterilizing retorts of the end-over-end agitation type, together with associated container conveying mechanism;

Fig. 2 is another diagrammatic view on a reduced scale of two sterilizing retorts differently arranged;

Fig. 3 is a fragmentary view in side elevation of one end of one retort and its associated loading conveyer apparatus as it is positioned in withdrawing containers of processed material from the retort;

Fig. 4 is another view generally similar to Fig. 3 but showing the apparatus positioned to feed containers of unprocessed material into the retort;

Fig. 5 is a fragmentary view in side elevation taken from the other side of the machine and showing the star wheel mechanism for controlling the feeding of containers into the retort;

Fig. 6 is a fragmentary view in end elevation of the retort showing the container receiving doorways and the internal closure apparatus for them;

Fig. 7 is a fragmentary view in vertical cross section through the loading trackways showing the shuttles for moving the container racks;

Fig. 8 is a fragmentary detailed view in perspective of part of a shuttle;

Fig. 9 is another view in transverse section through a container loading trackway taken on the plane represented by the line 9—9 in Fig. 4 and showing the apparatus for driving the conveyer which delivers the containers to the retort;

Fig. 10 is another detailed view in perspective of the rack handling shuttle;

Fig. 11 is a diagrammatic representation in longitudinal section through a retort showing a modified form of the container moving racks;

Fig. 12 is a fragmentary detailed view in transverse section through one of the container rack guideways in the modified retort;

Figures 13, 14:
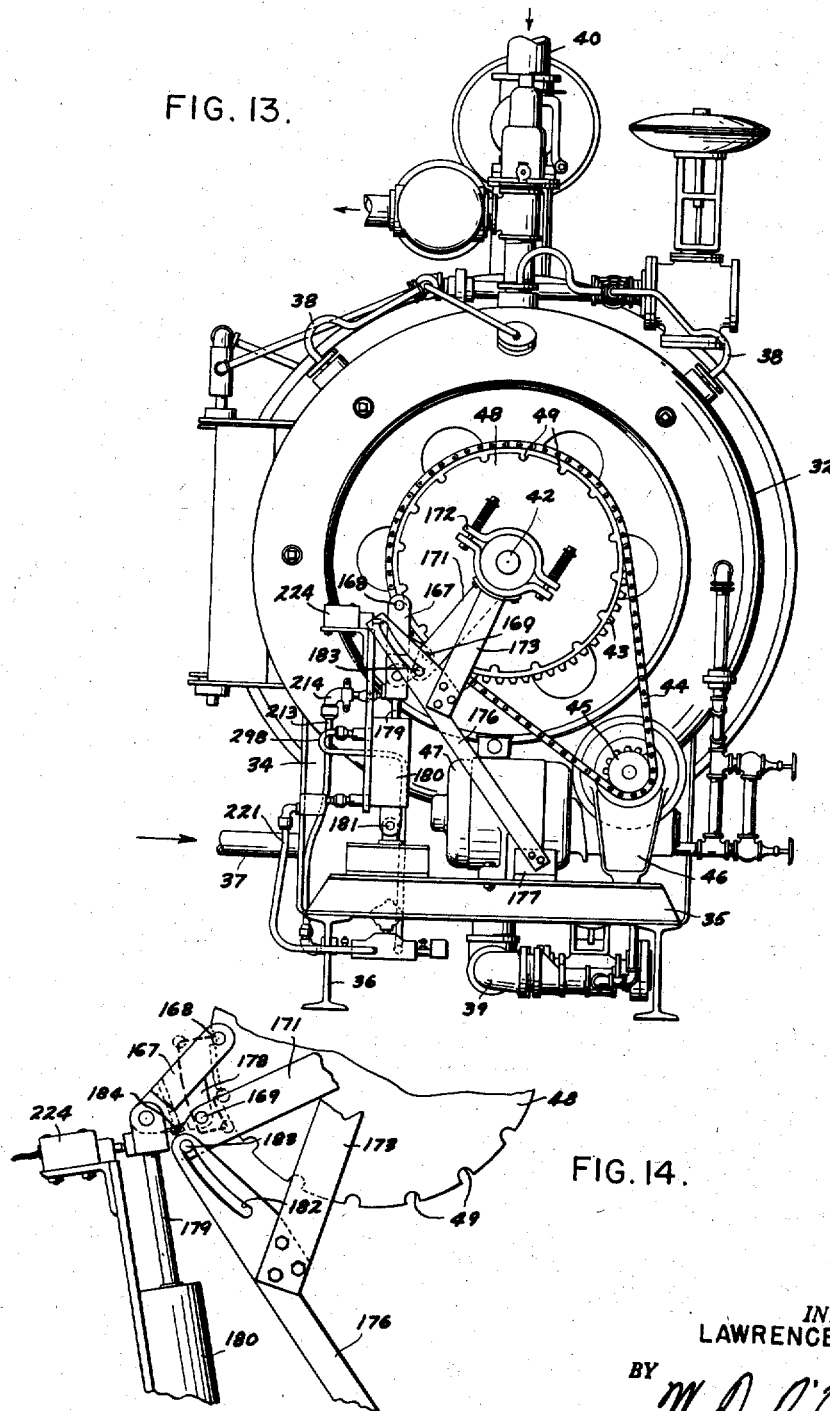
Fig. 13 is a view in end elevation taken from the end of the retort opposite that shown in Fig. 6 and showing the rotor indexing and the driving mechanism.
Fig. 14 is a fragmentary view showing the indexing mechanism in another position.

The improved agitating sterilizer equipment illustrated in the drawings as exemplifying the present invention is especially adapted to effect the processing of materials sealed in containers by the method involving agitating through end-over-end rotation. In this apparatus a batch of sealed containers enclosing comestibles or like material to be processed is loaded into a rotor housed within a sterilizing retort. The rotor is then rotated during the processing operation at the proper speed to effect end-over-end agitation of the container contents while they are subjected to the influence of heat transferring fluid in the retort. As explained in the Clifcorn et al. patent, agitation by the end-over-end method facilitates heat transfer to the container contents whereby the material may be heated uniformly and rapidly to a predetermined sterilizing temperature without danger of overheating any portion of it.

Referring now more specifically to the drawing and particularly to Figure 1 thereof, the improved sterilizing apparatus there shown is constituted by two sterilizing retorts 21 and 22 of the agitating type that are arranged to be operated cooperatively in conjunction with a unitary loading and unloading apparatus. The retorts 21 and 22 are of the type adapted to process material sealed in containers such as food packed in cylindrical metal cans C or the like. As shown in Figure 1, freshly filled containers C of material to be processed arrive at the apparatus upon an incoming conveyer 23 that feeds them into an accumulator 24 where surplus containers are stored temporarily. From the accumulator 24, cross conveyers 25 and 26 deliver the containers to the one or the other of pairs of loading or feeding conveyers 27 that are associated with the retorts 21 and 22 respectively. Containers of material that have been processed in the retorts are carried away upon transverse discharge conveyers 28 and 29 disposed below the feeding conveyers 27. It is preferable to arrange retorts such as the agitating sterilizers 21 and 22 in groups or pairs in the manner shown in Figure 1 in order that one retort may be operating to process containers of material while the other is being reloaded with unprocessed material.

Each of the two retorts 21 and 22 comprises essentially a pressure vessel or autoclave formed by a horizontally disposed cylindrical shell or housing 31 that is closed at one end by a dished head or end bell 32. The other end of the housing 31 is closed by means of a large hinged door 33 that is generally similar in shape to the head 32 and that may be opened to provide for installing the operating mechanism within the retort. As more fully explained in my copending application, the door 33 is sealed in closed position by releasable sealing means. As indicated in Figs. 3, 4 and 13, the cylindrical housing 31 is supported near its ends upon cradle members 34 that constitute part of a fabricated frame or base 35 mounted on skids 36 to form the supporting foundation for the retort. Steam for heating the material being processed is admitted into the retort through a steam pipe 37 and water for cooling the material after the heating process is admitted through a plurality of water supply pipes 38 at the top of the housing. A drain pipe 39 at the bottom of the housing 31 serves to drain away condensate and spent cooling water and an air pipe 40 at the top admits air to maintain pressure during cooling.

The containers C, which are shown as cylindrical metal cans but may be other similar containers, enclose food or like material with liquid and a suitable headspace. They are supported on a rotatable structure within the housing shell 31 in a radial position adapted for end-over-end rotation to agitate their liquid contents during processing. As indicated in Figs. 3 and 6 of the drawing, the containers C are distributed about the periphery of a cylindrical rotor or reel 41 that is mounted for rotation about the horizontal longitudinal axis of the housing 31. The container carrying rotor or reel 41 is preferably generally similar in construction to the rotor described in my previously mentioned Patent No. 2,816,841 and is carried by a driving shaft or axle 42 that projects through and is rotatably mounted in the dished head or end closure 32 of the retort housing. As shown in Figs. 1 and 13, the projecting end of the rotor shaft 42 carries a large sprocket wheel 43 that is driven by a chain 44 for rotating the rotor 41 during the processing operation. The chain 44 runs over and is driven by a small sprocket 45 that is fixed on and driven by a speed reducing mechanism 46 mounted on the end of the supporting frame 35. The mechanism 46 is in turn driven by an electric motor 47 also mounted on the frame 35, that may be energized by suitable control apparatus to effect rotation of the rotor 41 during processing. The projecting end of the drive shaft 42 is furthermore provided with an indexing plate or wheel 48 presenting a series of spaced indexing notches 49 by means of which the rotor 41 may be positioned angularly during loading and unloading of the batch of containers.

The container carrying rotor or reel 41 is provided with angularly spaced longitudinally disposed container receiving slots or trackways 51 arranged about its periphery. Each trackway 51 is adapted to receive a row or series of cylindrical containers C arranged in side by side relationship with their axes disposed radially of the axis of rotation of the rotor 41. As best shown in Fig. 6, the trackways 51 in this particular construction are recessed in the periphery of the reel 41 and are in the form of open-work channels encompassing the containers C on all sides to retain them in the preferred radial position during rotation of the rotor. The inner and outer faces of each trackway or slot 51 are provided with grooves or guideways 52 and 53, respectively, extending along the ends of the containers C and adapted to receive the longitudinal side members of movable container spacing and moving racks 54 that are slidably arranged to move the rows of containers into or out of the rotor trackways 51.

As best shown in the perspective view Fig. 10, each container moving rack may be in the form of a ladder-like structure comprising a cylindrical inner side rail 55 and a cylindrical outer side rail 56 of smaller diameter interconnected by spaced transverse cross members or rungs 57 to form therebetween container receiving pockets 58. As shown in Fig. 6, one of the ladder-like racks 54 is disposed in a radial plane through the center of each container receiving trackway 51 with the larger side rail 55 engaging the inner guideway 52 and the smaller side rail 56 engaging the outer guideway 53. The containers C are disposed in the pockets 58 of the rack 54 in radial position with their end beads restrained by the side pieces 55 and 56 and by the cross members 57 for movement in a row into or out of the trackway 51.

As best shown in Fig. 6, the trackway 51 is so arranged that the bead at the inner end of each container is disposed to engage and roll along one or the other of opposed flat guideways 61 at the respective sides of the slot 51 and the bead at the outer end is disposed to roll along one or the other of similar opposed flat guideways 62 at the respective sides of the outer end of the slot 51. Thus, when the rotor is in a position in which the axes of the containers are disposed horizontally, and the rack 54 is moved along its guideways 52 and 53 in the container trackway 51, the row of containers C may be caused to roll along the flat guideways 61 and 62 in moving into or withdrawing from the trackway 51 in the rotor 41. Accordingly, when one of the racks 54 is withdrawn from one of the trackways or slots 51 after a processing operation, successive containers C rolling out of the slot will drop out of the pockets 58 and be discharged from the apparatus. Conversely, when the rack 54 is moved into a trackway 51, new containers C of unprocessed material that are fed into the successive pockets 58 will roll into the trackway to form a continuous row of containers as indicated in Fig. 3 extending from end to end of the rotor 41. In order that the containers may roll easily into the rotor trackways, it is preferable that the unloading and loading operations be performed in trackways 51 that are disposed in a horizontal position. For this purpose the rotor 41 is indexed to a position in which a trackway 51 to be unloaded and reloaded lies in a horizontal diametrical plane of the retort in order that the can beads may roll along the lower flat guideways 61 and 62 in rolling out of or into the trackway.

Since two of the trackways 51 are in position simultaneously for receiving containers C with their axes disposed horizontally at the opposite ends of a horizontal diameter of the retort, it has been found preferable to load and unload these two trackways at the same time in order to keep the rotor 41 in balance about its axis, both during the loading operation and during subsequent rotation thereof while the material is being processed. For this purpose the large end closure door 33 of the retort housing is provided with two relatively small container receiving ports or doorways 65 and 66 disposed on a horizontal diameter of the retort, as shown in Fig. 6, in position to align respectively with two diametrically opposed trackways 51 when the rotor 41 is indexed to a position in which the trackways lie in the horizontal plane, the doorways being of proper shape and size to admit the passage of containers rolling on their sides. Thus, in loading the rotor or reel 41, the two horizontally disposed trackways are loaded simultaneously and since they are on opposite sides of the axis of rotation the reel is maintained in balance. The rotor 41 may then be indexed to present another pair of trackways 51 in the horizontal position and when they are similarly loaded the reel will continue to be in balance. This process may be continued until all of the trackways are loaded, the reel being thus maintained in balance throughout the loading operation to facilitate indexing. Furthermore, should the loading operation be terminated, for lack of containers for example, before all of the trackways 51 are filled, the rotor 41 will be maintained in balance and ready for rotary operation with less than a full load of containers.

Although the container moving racks 54 are shown as being in the form of rigid ladder-like structures adapted to be moved into and withdrawn horizontally from one end of the rotor 41 these racks may take various forms such as the form illustrated diagrammatically as a modification in Figs. 11 and 12 of the drawing. In this instance the side members of the ladder racks instead of being rigid are formed by jointed transmission chains 70 preferably of the type provided with rollers 71 between the chain links. The rollers 71 are disposed to roll in restraining guideway grooves 72 arranged along the inner and outer ends of the slots 51 in place of the guideways 52 and 53 shown in Fig. 6. The two chain side members 70 are interconnected by transverse or cross members 73 arranged to form a chain ladder rack 75 and constituting between them the container receiving pockets 58. As best shown in Fig. 12, the cross members 73 may be provided with small rollers 74 disposed in position to engage the beads of the containers C to afford a rolling action as the containers are rolled along the guideways.

As indicated in Fig. 11, each of the container receiving trackways 51 is provided with a section of the chain ladder rack 75 of length about equal to the length of the rotor 41 to accommodate a full row of containers C. The side members 70 of the chain ladder racks 75 being flexible, it is not necessary to withdraw this rack straight out from the rotor 41 as in the case of the rigid ladder racks 54 of the type shown in Fig. 10. Hence it is not necessary to provide space for withdrawing the racks horizontally which is particularly important with long retorts. Furthermore, in unloading and reloading the slots 51 of the rotor 41, it is feasible to push the chain ladder racks 75 in one end of the rotor and out the other end as indicated in Fig. 11, the chains being curved about as required at each end of the machine. According to this arrangement, the containers C in the chain ladder rack 75 being pushed out of the rotor, drop out of the pockets 58 onto an inclined discharge chute 76 that is arranged to permit them to roll away from the retort. Because of the flexibility of the chain ladder rack 75 in moving out of the rotor, its chain side members 70 may be caused to turn about a pair of sprockets 77 and guided within spaced guideways 78 that direct the rack upward along the end of the retort to a pair of sprockets 79 which again turn the chains and direct them into horizontal return guideways 80 extending along the top of the retort toward the loading end thereof.

From the guideways 80, the successive chain ladders 75 move around a pair of sprockets 81 and downward through guideways 82 that intersect with an inwardly inclined container delivering chute 83. During a loading operation, the chain ladder moving downwardly in the guideways 82 interlaces with the row of containers C moving downwardly in the intersecting chute 83 in such a manner that the containers enter successive pockets 58 between the cross members 73 of the ladder. The loaded chain ladder then runs around a pair of sprockets 84 which turn the chains 70 to a horizontal position and push them into the guideways 72 of the rotor slots 51. Thus, in loading the rotor, the sprockets 84 cause the incoming chain ladder to push into the rotor slot and force out of the other end thereof the chain ladder section containing the processed containers. After the trailing end of the chain ladder passes around the sprockets 84, it is forced forward by the forward end of the following ladder to position it in the rotor slot 51. The preceding and following chain ladders may then be withdrawn out of interfering relationship with the ends of the rotor slot by operation of the sprockets 77 and 84 whereupon the rotor may be indexed to present a successive slot in order that the loading operation may be repeated. Thus, each chain ladder as it is discharged from one end of the rotor 41 is carried upward and back over the top of the retort to be fed into a successive rotor slot with a new change of containers of material to be processed.

If it is desired to feed the containers into and remove them from the same end of the machine as with the rigid ladder, the chain ladder 75 may either be deflected upwardly out of the way when withdrawn from the rotor slot or as an alternative it may be wound onto a reel or drum as it is retracted and then unwound as it is filled with containers in reloading the rotor slot.

The container receiving openings or doorways 65 and 66 in the end of the retort are preferably closed by internal doors 85 and 86 respectively after the rotor has been loaded and the apparatus is ready for the processing part of the cycle. As indicated in Fig. 3, the internal door 85 is disposed inwardly of the doorway 65 and between it and the end of the rotor 41. In this position the doors 85 and 86 are out of the way and when moved into closed position are held against the inner edges of the ports or doorways 65 and 66 by the pressure of the processing steam within the retort housing 31. Because of being sealed by steam pressure, the doors need be of only light construction. As best shown in Fig. 6, the internal doors 85 and 86 are carried on the opposite ends of an interconnecting arm structure 87 that is made up of upper and lower resilient beams 88 and 89 pivotally connected at their ends to the upper and lower edges of the doors 85 and 86 respectively. The beam elements 88 and 89 are connected together at their midportions by a transverse member 91 that is secured to an axially disposed trunnion or journal 92 extending outwardly through and rotatably and slidably mounted in the center of the end closure door 33.

By rotating the trunnion 92, the internal door structure may be swung from the open position shown in dot dash lines in Fig. 6 to the closed position shown in full and dotted lines, wherein the two pivotally supported door elements 85 and 86 align with and engage the inner edges of the corresponding doorways 65 and 66. Rotary movement of the trunnion 92 for this purpose is effected by means of a lever arm 93 secured to the exposed end of the trunnion and operatively connected at its outer end to the end of a piston rod 94 operating in a cylinder 95. To effect the closing movement of the doors by power, air under pressure is admitted from an air supply line 100 through a control valve 101 actuated by a lever 102. With the lever 102 in the position shown in solid lines, the valve 101 admits air under pressure into a conduit 103 leading to the left end of the cylinder 95 while releasing air from the right end thereof in order to force the piston rod 94 and the lever arm 93 to the right as indicated in the drawing.

After the doors have been moved to closed position they may be brought into sealing engagement with the inner edges of the doorways by slidably moving the trunnion 92 outward to engage the doors with the doorway edges and to exert pressure on them through action of the resilient beams 88 and 89. In this manner, the doors 85 and 86 are brought into alignment with and are resiliently urged into engagement with the inner edges of the doorways to prevent the escape of steam during processing. Outward movement of the trunion 92 is provided by means of a lever arm 105 that is connected at its middle by a universally mounted pivot 106 to the outer end of the trunion. As shown, the lever 105 is disposed vertically with its lower end pivotally mounted on a pin 107 that is supported on the face of the large door 33 by means of a bracket 108. The upper end of the arm 105 is pivotally connected to the outer end of a piston rod 111 which cooperates with a cylinder 112 also mounted on the large door 33. To effect sealing engagement of the doors 85 and 86 by power, air is admitted from the air supply line 100 through a valve 113 under the control of a lever 114. With the lever 114 in the position shown in solid lines, the air under pressure flows into a conduit 115 that is connected to the inner end of the cylinder 112 and air is released from the outer end thereof causing the piston rod 111 to move outwardly thereby forcing the trunion 92 to slide outward and urging the doors 85 and 86 into sealing engagement with the doorway edges.

If now through inadvertance the valve lever 102 should be moved toward its dotted line position with the intention of swinging the doors out of alignment with the doorways, it will contact the end of the lever 114 which is in interfering position. This prevents sufficient movement of the lever 114 to shift the valve 101 far enough to cause the swinging movement. The interfering or interlocking arrangement thereby provided prevents swinging movement of the doors when they are engaged with the inner edges of the doorways and requires that to effect opening of the doors the valve lever 114 must first be swung to its dotted line position. This admits air under pressure from the line 100 into a conduit 116 leading to the outer end of the cylinder 112 and releases air from the inner end thereof through the conduit 115 thereby forcing the piston rod 111 inwardly which slides the trunion 92 inwardly and thereby withdraws the doors 85 and 86 from contact with the doorway edges. The valve lever 102 may then be swung to its dotted line position thereby admitting pressure from the line 100 into a conduit 117 that leads to the right end of the cylinder 95 and releasing pressure from the left end thereof through the conduit 103. This causes the piston rod 94 to move to the left thereby turning the lever arm 93 and the trunion 92 to swing the doors 85 and 86 out of alignment with the doorways to the position indicated in dot dash lines in the drawing. With the valve lever 102 in the left or dotted line position, it then interferes with movement of the valve lever 114 to the sealing position and thereby prevents movement of the doors to a position in which they would interfere with the doorway edges when swung to the closed position. By this interlocking arrangement of the two valve levers 102 and 114, the doors are prevented from being swung between open and closed position except when they are retracted from the doorways and are likewise prevented from being moved to sealing position except when they are in alignment with the doorways.

With the doors 85 and 86 in open position as shown in Fig. 3, the ladder racks 54 may be withdrawn through the doorways 65 and 66 into a pair of external loading trackways or racks 121 and 122. As shown in Figure 1, the loading racks 121 and 122 are of sufficient length to accommodate the ladder racks 54 and their actuating apparatus when withdrawn completely from the trackways 51 in the rotor 41. As best shown in the sectional view Fig. 9, each of the loading racks is constituted by a pair of spaced channel members 124 that constitute a frame structure and that carry on their inner surfaces V-shaped guideways 125 and 126 that are generally similar to and disposed in alignment with the guideways 52 and 53 in the corresponding slot 51 of the rotor 41. As indicated in the drawing, as the ladder rack 54 is withdrawn from the rotor, it enters and is guided by the guideways 125 and 126 of the loading trackway.

As shown in Fig. 3, a movable discharge gate or chute 128 is pivotally mounted beneath the end of each loading trackway 121 or 122 that is adjacent to the retort doorway. With each chute 128 pivoted to the downwardly inclined position, as shown with respect to the trackway 121 of the retort 21 in Fig. 3, containers C being drawn out of the retort with the ladder rack 54 roll down the inclined surface of the chute 128 and out of the ladder rack pockets 58 onto an inclined discharge trackway 129. The inclined trackway 129 leads into a twister 130 which turns the containers from horizontal position and delivers them on end to the transverse discharge conveyor 28 that carries them away from the retort. Containers discharged simultaneously at the other trackway 122 are delivered to and carried away by the other discharge conveyor 29.

After the ladder rack 54 has been withdrawn completely from the retort into the guideways 125 and 126 of the loading rack 121, the pivotally mounted discharge gate 128 is tilted upwardly to the position shown in Fig. 4. As there shown, the gate 128 is pivotally mounted on a transverse shaft 133 that is rotatably journalled beneath the loading trackway 121. The gate 128 is provided with a depending lever arm 134, the lower end of which is connected to a piston rod 135 operating in a horizontal cylinder 136 that serves to tilt the gate 128 to the one or the other position by power. As shown in Figs. 3 and 4, the gate or chute 128 is provided with vertical side pieces 138 that support a top cross member 139 spaced above the chute 128 a sufficient distance to provide for rolling movement of containers C between them. When the gate is inclined upwardly as shown in Fig. 4, it is in position to receive containers of unprocessed material that are delivered to the retort by the feeding conveyor 27.

As shown in Figs. 1, 4 and 9, each feeding conveyer 27 is in the form of a chain conveyer the discharge end of which runs over a sprocket 142 carried by a shaft 143 that is rotatably supported by journal bearings 144 mounted on supports 145 carried by the channel members 124 of the loading rack. Containers C delivered in upright position by the conveyer 27 slide from its end into a feed chute 146 that is inclined at about fifteen degrees and that leads into a container twister 147 which turns the containers on their sides. As the containers enter the inclined chute 146 they have a tendency to tip or tilt in such a manner that the trailing edge of the lower bead of the container entering the chute may be lifted into contact with the side of the following container in a manner to scratch or otherwise damage its surface or perhaps damage the seal between the side and the end of the container. To avoid the occurrence of such an unfavorable situation, the conveyer chain 27 is operated over a curved guide member 148 as it approaches the sprocket 142. As shown in Fig. 4, the curved guide member 148 is tangent at one end with the horizontal run of the chain conveyer 27 and is tangent at the other end with the inclined chute 146. Accordingly, containers C on the conveyer running over the curved guide element 148 progress gradually from the vertical position to an inclined position with their lower beads more or less in alignment and without danger of the beads scraping the surfaces of the following containers.

After the containers are turned on their sides in the twister 147 they pass beneath a rotating star wheel 149 that may be held stationary when it is desired to stop the flow of containers. After passing the star wheel 149 the containers roll onto the inclined gate 128 and feed into the pockets 58 between the cross members 57 of the ladder rack 54 as it is pushed into the retort. This is accomplished smoothly without shock or change of speed since the containers all move at the speed of the ladder in advancing into the retort. During this operation the upper element 139 of the pivotally mounted chute 128 serves to guide the containers into the ladder spaces and to prevent them from piling up and jamming at the entrance to the doorways.

In order that containers C may be available for loading into the retort at all times, all of the feeding conveyers 27 are driven continuously at a relatively low speed whenever the equipment is in operation. As shown in Figs. 4 and 9, the shaft 143 of the feeding trackway unit 121 that carries the chain conveyer sprocket 142 is provided with a driving sprocket 150 that is arranged to drive the shaft by means of an overrunning clutch 151. As shown in Fig. 4, the sprocket 150 is driven by a chain 152 that is in turn driven by a small sprocket 153 on the shaft of a driving motor and speed reducing unit 154. As shown in Figure 1, the shafts 143 of the loaders 121 and 122 are connected together in order that their two conveyers 27 may both be driven in unison by the same motor 154. When the motor 154 is energized, the two feeding conveyers 27 are driven slowly to deliver containers from the cross conveyers 25 and 26, to the inclined chutes 146. As each feeding conveyer 27 becomes filled with containers, the forward movement of the containers is stopped by their engagement with the locked star wheel 149 or with containers already in the chute 146 or on the conveyer 27, whereupon the conveyer chain 27 slides beneath the row of containers C as it continues to operate at slow speed.

Although the ladder racks 54 may be moved into and out of the slots 51 in the retort reel 41 by manually actuated means, it is preferable to effect this operation by power driven apparatus. For this purpose there is slidably mounted in each loading rack 121 and 122 a power actuated shuttle member 155 shown in Fig. 3 and in perspective in Fig. 10 and that is arranged to engage the ladder rack and reciprocate it in the loading and unloading movements. The shuttle 155 is provided with side pieces that fit in the V-shaped guideways 125 and 126 and that are similar to and disposed in alignment with the side rails of the ladder racks 54. For withdrawing the ladder rack, the shuttle 155 is provided with a releasable hook 156 that is arranged to engage the end cross member 57 of the ladder. Power for moving the shuttle 155 to withdraw or replace the ladder rack 54 is provided by means of a chain 157 the ends of which are secured to a lug 158 depending from the shuttle. As best shown in Fig. 3, the chain 157 operates over a driven sprocket 159 that is fixed on the shaft 133 at the end of the loading rack adjacent to the retort. At the other end of the loading rack 121 the chain 157 operates around an idler sprocket 160 that is supported from the channels 124 constituting the frame of the loading rack. By operating the driven sprocket 159 in the one or the other direction, the shuttle 155 may be caused to slide along the guideways 125 and 126 to withdraw the ladder rack from or reinsert it into a slot 51 of the rotor 41.

Power for operating the sprockets 159 of the pair of feeder racks 121 and 122 is derived from a reversible motor and speed reduction unit 161 that is connected by a chain and sprocket drive mechanism 162 to drive a jack shaft 163 as shown in Fig. 4. The jack shaft 163 extends across the two feeders or loading racks 121 and 122 as shown in Figure 1, and carries two pulleys 164 from which belts 165 transmit power to pulleys 166 on each of the shafts 133 which carry the sprockets 159. By this arrangement the two shuttles 155 may be operated simultaneously in either direction by energizing the motor 161 to drive in the desired direction. Then when either shuttle 155 arrives at the end of its range of travel, the corresponding belt 165 will slip on one or the other of its pulleys thereby avoiding damage to the apparatus. Thus the motor 161 may continue to operate for a time after the two ladder racks 54 have been completely inserted in or completely withdrawn from the retort, the belts slipping until the motor is deenergized by manual control.

After the ladder rack has been reloaded and reinserted into the rotor slot, the hook 156 is disengaged and the shuttle withdrawn to permit indexing of the rotor 41 to bring a successive slot 51 into alignment with the doorway 65. In the particular sterilizing retort illustrated in the drawing, the rotor or reel 41 is about fifty inches in diameter and is about one hundred twenty seven inches long. The periphery of the rotor is provided with a total of sixteen slots or trackways 51, each of which is adapted to receive nineteen containers C of the size for which the apparatus is designed, making the total capacity of the rotor three hundred four containers for processing as a batch. Since the rotor 41 of this apparatus is provided with sixteen slots 51 equally spaced about its periphery, the indexing plate 48 on the extending end of the rotor shaft 42 is likewise provided with sixteen notches 49 corresponding in position with the sixteen trackways, respectively. However, since the trackways are loaded two at a time it is only necessary to turn the rotor through one half revolution to load all of the slots and, therefore, only one half of the indexing notches are utilized during one loading operation to establish the eight different loading positions of the rotor.

For effecting the indexing movement of the rotor, there is provided a pawl 167 that carries an index pin 168 adapted to engage with any one of the indexing notches 49 of the index plate 48. As best shown in Fig. 13, the pawl 167 is pivoted by means of a pivot pin 169 on the outer end of an indexing arm 171 that is in this instance pivotally mounted concentric with the shaft 42 for angular movement with the index plate 48 in effecting an indexing operation. Angular movement of the arm 171 is resisted by an adjustable brake mechanism 172 that is carried by a stationary torque arm 173 that is fixed at its outer end to a strut 176 which is connected at its lower end to the frame 35 by means of a bracket 177. The brake 172 is arranged to afford moderate resistance to the movement of the indexing arm 171 relative to the stationary torque arm 173. The pivotally mounted pawl 167 is of bell crank shape and has an arm 178 extending inwardly to the pivot pin 169. The outer end of the pawl 167 is pivotally connected to the upper end of a piston rod 179 which cooperates with a cylinder 180 the lower end of which is pivotally connected by a pin 181 to the frame 35 of the retort.

When it is desired to position two of the rotor slots 51 in alignment with the doorways 65 and 66 respectively for an unloading and reloading operation, pressure fluid such as air is admitted to the lower end of the cylinder 180 in a manner to force the piston rod 179 upward. Since the indexing arm 171 resist movement through action of the brake 172, the upward movement of the piston rod 179 tends to pivot the pawl 167 clockwise about the pivot pin 169 to bring its indexing pin 168 into contact with the periphery of the index plate 48 as shown in Fig. 13. Further pivoting movement of the pawl 167 is thereby prevented whereupon continued upward movement of the piston rod 179 then overcomes the resistance of the brake 172 and moves the indexing arm 171 and the pawl 167 angularly in clockwise direction relative to the index plate 48 until the pin 168 comes into alignment with one of the indexing notches 49. The brake 172 will then momentarily stop the movement of the indexing arm 171 while the pawl 167 pivots clockwise about the pin 169 to move the index pin 168 into the notch 49. Further upward movement of the piston rod 179 will then overcome the brake again to advance the pawl 167, the indexing arm 171 and the indexing plate 48 as a unit thereby turning the rotor 41. As shown in Figs. 13, and 14, the upper end of the fixed strut 176 is provided with a long arcuate slot 182 that receives a stop pin 183 on the outer end of the indexing arm 171 in a manner to limit the range of movement of the indexing arm. When the piston rod 179 has moved upward to the position in which the stop pin 183 contacts the upper end of the slot 182, as shown in Fig. 14, the indexing movement ceases with the reel 41 positioned with two of the trackways 51 in alignment with the doorways 65 and 66 respectively.

During the loading operation, air pressure is maintained in the lower end of the cylinder 180 to retain the rotor locked in the indexed upper or loading position. After the two trackways 51 have been unloaded and reloaded as previously described, the indexing mechanism is retracted preparatory to a subsequent indexing operation. For this purpose, air under pressure is admitted to the upper end of the cylinder 180 thereby forcing the piston rod 179 downward. Since the brake 172 then resists downward movement of the indexing arm 171, the first downward movement of the piston rod causes the pawl 167 to be pivoted in counter-clockwise direction about the pivot pin 169 to withdraw the indexing pin 168 from the notch 49 of the index plate 48.

The counter-clockwise pivoting movement of the pawl 167 is limited by an adjusting screw 184 threaded therein, the head of which comes into contact with the pin 183 on the indexing arm 171 at the end of its retracting movement. Further downward movement of the piston rod 179 then turns the indexing arm 171 counter-clockwise through overcoming the resistance of the brake 172 until the stop pin 183 at its end engages the lower end of the arcuate slot 182 in the strut 176 as shown in Fig. 13. The subsequent indexing movement may then be effected by readmitting air to the lower end of the cylinder 180 thereby pivoting the pawl 167 about the pin 169 on the indexing arm 171 to move the index pin 168 into engagement with the next indexing notch 49 in the plate 48. Further movement of the piston rod 179 upward will then overcome the friction of the brake 172 and effect the clockwise indexing movement of the arm 171 and the index plate 48 as previously explained, to position the rotor 41 for the next loading operation. The path of movement of the indexing pin 168 is indicated in dotted lines in Fig. 14.

In starting a loading and processing operation, the container delivering conveyer 23 will be operating to bring freshly sealed containers C of material to be processed to the accumulator 24 which will also be operating. Assuming that the retort 21 is to be loaded first, the processing controls will be deenergized with the rotor 41 stationary and the steam off after having finished a previous processing operation upon containers in the rotor slots 51. The doors 85 and 86 may now be opened by first moving the valve lever 114 to the left as shown in Fig. 6 to effect the unsealing movement as previously explained and then swinging the valve lever 102 to the left to effect swinging movement of the doors from the closed position shown in solid lines to the open position indicated by the dot dash lines in the drawing, thereby opening the doorways 65 and 66 for the passage of containers out of and into the retort 21.

Figure 15:
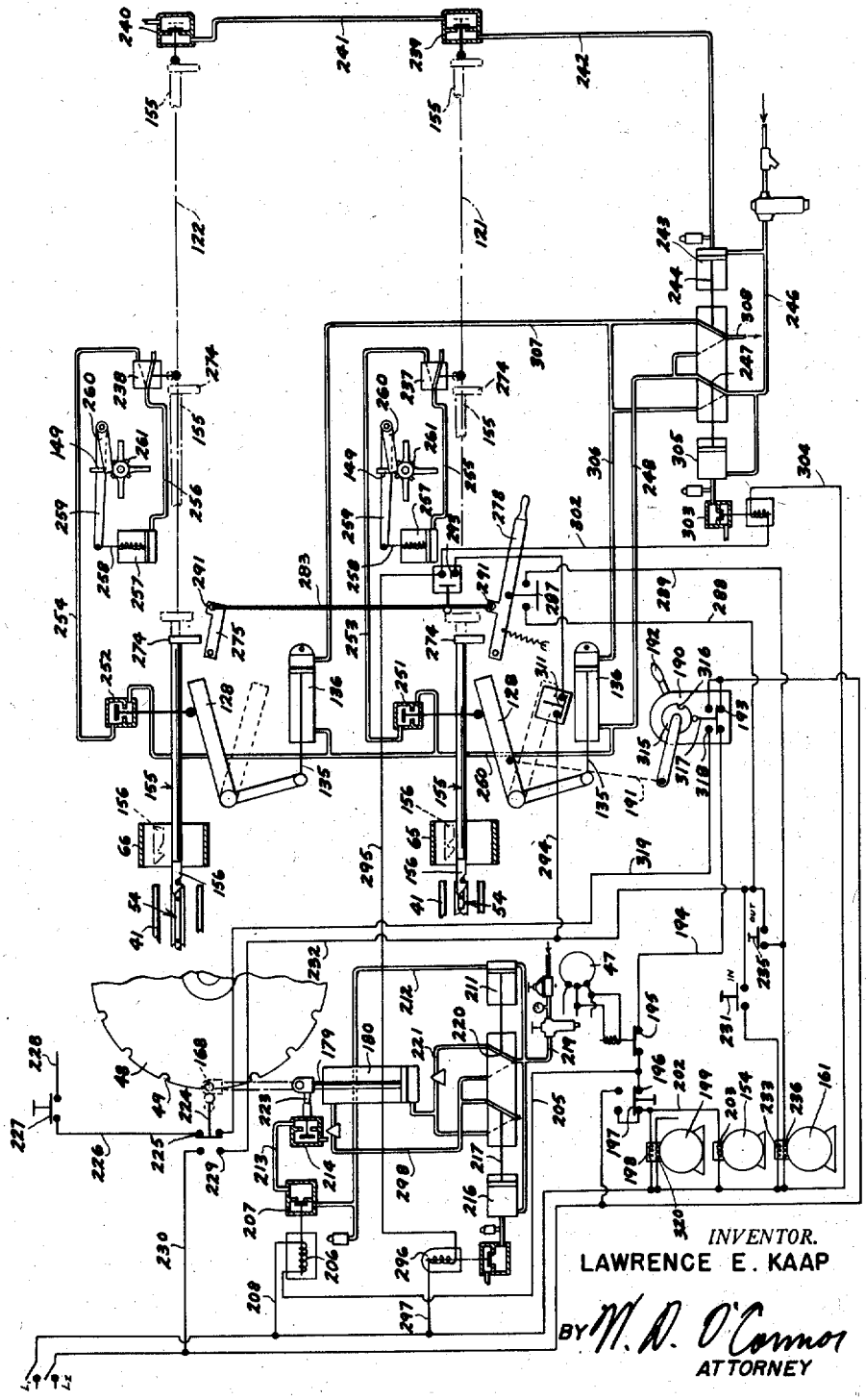
Fig. 15 is a schematic circuit diagram of the operating and control mechanism for feeding containers of material into and discharging them from the rotor of the retort.

Electrical energy for operating and controlling the container discharging and feeding mechanism is supplied from line conductors L1 and L2 shown at the left in the control circuit diagram Fig. 15. In order that the sixteen slots 51 in the rotor 41 may be counted as they are loaded, the control system is provided with a mechanical counter 190 that is connected by linkage 191 to one of the pivotally mounted chutes 128 for operation therewith. A hand lever 192 is provided on the counter 190 for resetting it to "zero" position at the beginning of a loading operation. By actuating the lever 192, the operator resets the counter 190 to "zero" and at the same time closes switch contacts 193 associated with it to complete a connection from the line conductor L2 to a conductor 194. The conductor 194 leads to a relay 195 that is interconnected with the process control system, shown only in part in the drawing, in such a manner that the relay is closed only when the reel rotating motor 47 is deenergized. From the relay 195, a conductor 196 leads to a jogging control switch 197 that connects with one control winding 198 of a reversible cross conveyor driving motor 199 that is connected to drive the cross conveyors 25 and 26, the winding 198 being also connected to the return conductor L1. Resetting of the counter 190 to "zero" thus starts the cross conveyer motor 199 in the direction to operate the cross conveyers 25 and 26 to deliver containers of materials to the feeding conveyers 27 of the retort 21 which is being loaded. A conductor 202 leading from the jogging control switch 197 completes a circuit to the control winding 203 of the feeding conveyer motor 154 and thence to the return line conductor L1 thereby starting the feeding motor to drive the two feeding conveyers 27 at slow speed, each conveyor 27 being of length suitable for receiving in this instance a load of nineteen containers from the cross conveyers 25 and 26.

Another conductor 205 leading from the energized conductor 196 completes a circuit which energizes a coil 206 of an electromagnetic valve 207, the circuit continuing through a conductor 208 to the return line conductor L1. This results in moving the valve 207 to open position thereby permitting air to discharge from the right end of a valve actuating cylinder 211 through a conduit 212, the valve 207, a conduit 213 and a valve 214 of the indexing mechanism that is then open to the atmosphere. With the cylinder 211 thus vented, air under pressure admitted to an opposed cylinder 216 causes a four-way valve piston 217 to move to the right in the cylinders 216 and 211 to the position shown in the drawing. This provides for admitting air under pressure from a pressure line 219 through a port 220 of the valve piston 217 and a conduit 221 to the lower end of the indexing cylinder 180. This forces the piston rod 179 upward thereby causing the indexing pin 169 to move into engagement with one of the indexing notches 49 of the indexing plate 48 as previously explained.

Upward movement of the piston rod 179 thereupon effects initial indexing of the reel 41 as previously explained to a position in which an opposed pair of container trackways 51 are disposed in alignment with the containner receiving doorways 65 and 66. This first movement of the piston rod 179 also moves an actuating cam 223 thereon out of engagement with the valve 214 thereby permitting it to close, then moves the cam 223 into engagement with a switch 224 at the end of the indexing stroke. The cam 223 thereby opens contacts 225 of the switch 224 leading to a conductor 226 that furnishes energy to the processing control system through a process starting push button control switch 227 and a conductor 228. With the contacts 225 open, any possibility of starting the motor 47 that drives the reel 41 while the indexing pawl 167 is engaged with the indexing disc 48 is obviated. The operation of the switch 224 also closes contacts 229 in a conductor 230 leading from the line conductor L2 and that supplies energy for operating the ladder rack moving shuttles 155. Thus, upon resetting the timer 190 to "zero" position, the operator also starts both the cross and the feeding conveyers, effects an indexing movement of the rotor to the initial loading position and energizes the ladder feeding circuit while simultaneously deenergizing the processing control circuit.

With the container receiving doorways 65 and 66 open and the rotor 41 indexed to align the first pair of trackways 51 with the doorways, the operator proceeds to couple the shuttles 155 of the loading trackways 121 and 122 with the ladder racks 54 in the rotor trackways 51. This is accomplished by pressing an "in" or "load" push button switch 231 to close a circuit which leads from the line conductor L2 through the conductor 230 and the closed contacts 229 of the index switch 224 through a conductor 232, the closed switch 231 and an "in" control winding 233 of the shuttle feeding motor 161 which is connected with the return conductor L1. This energizes the motor 161 for operation in direction to move the shuttles 155 inward through the doorways 65 and 66 respectively a distance of about three inches. When the shuttles 155 contact the ladder racks 54 the hooks 156 ride up on the first cross member 57 of each rack as best shown in Fig. 10 and hook over it to couple the shuttle to the ladders. As each shuttle engages and hooks to its respective ladder rack, the belt 165 driving it slips on its pulleys to prevent jamming and injury to the apparatus, the motor 161 continuing to run until the operator releases the push button switch 231 to deenergize it.

With the shuttles 155 coupled to the ladders 54, the operator now closes and holds an "out" or "unload" push button switch 235 which closes a circuit leading from the energized conductor 232 through the closed switch 235 and an "out" or reverse control winding 236 of the shuttle driving motor 161 which is connected with the return conductor L1. This energizes the motor for operation in direction for moving the two shuttles 155 outward along the loading trackways 121 and 122. If the retort already contains a batch of containers C of material that has been processed, the containers are withdrawn with the ladder racks 54 and drop out of the pockets 58 onto each inclined chute 128 from which they roll along the inclined trackway 129 and through the twister 130 onto the transverse discharge conveyer 28, as best shown in Fig. 3 or the conveyer 29, as the case may be.

As the shuttles 155 move back along the trackways 121 and 122, they engage intermediate control valves 237 and 238 moving them from the exhaust position shown in the diagram to their upper or open positions, these valves each being held open as long as the corresponding shuttle remains outwardly of them. As the two shuttles 155 reach the outer ends of their withdrawing travel in the trackways 121 and 122, they engage and open two control valves 239 and 240 respectively and come to a stop with their driving belts 165 slipping until the operator releases the "Out" push button 135, When each ladder has been fully withdrawn in this manner, all of the processed containers that may have been in its pockets 58 have discharged down the inclined chute 128. As shown, the valve 240 is open to atmosphere and the valve 239 is opened to a conduit 241 that discharges through the valve 240 to the atmosphere. Thus, with both ladders fully withdrawn, all of the containers discharged and both valves open, air is permitted to escape from a conduit 242 through the valve 239, the conduit 241 and the valve 240 to relieve pressure from the right end of a control cylinder 243 which permits a control valve piston 244 to move to the right to the position shown in the drawing. With the valve piston 244 in this position air under pressure from a supply line 246, flows through a port 247 in the valve piston 244 and a conduit 248 to the left end of the chute actuating cylinder 136 associated with the trackway 121. A branch conduit 250 leads to the left end of the chute actuating cylinder 136 associated with the other trackway 122 and shown above in Fig. 15. Air under pressure in the left ends of the two cylinders 136 causes their piston rods 135 to move to the right thereby tilting the chutes 128 to the upper or feeding position as shown in Figs. 4 and 15 and preventing further discharging of containers onto the transverse conveyors 28 and 29. This upward movement of the chutes 128 also actuates the counter 190 through the linkage 191 to record the fact that processed containers have been discharged from one pair of the rotor slots 51 by indicating the count of "one." The chutes 128 being now in the upper position, movement of unprocessed containers into the inclined discharge chute 129, is prevented since the chutes 128 now form part of the inclined trackway leading into the retort.

When the chutes 128 arrive at their upper positions they engage and open a pair of valves 251 and 252 respectively, that are connected to receive air under pressure from the branch line 250. With the valves 251 and 252 open, air is admitted to conduits 253 and 254 that lead to the open intermediate valves 237 and 238 respectively. From the valves 237 and 238 conduits 255 and 256 lead to the lower ends of actuating cylinders 257 associated with the two star wheels 149. Pressure thus applied to the cylinders 257 causes piston rods 258 therein to move upward thereby tilting a pivoted pawl lever 259 to lift a pawl 260 out of engagement with a locking abutment 261 on the associated star wheel 149, as indicated in Fig. 5. In this manner, the two star wheels 149 are released to permit the feeding of containers of unprocessed material into the retort, the arrangement being such that the star wheels cannot be released until the inclined chutes 128 are in their upper positions to prevent the possibility of unprocessed containers being diverted into the discharge chute 129.

With both the chutes 128 shifted to the upper position and the star wheels 149 released, the apparatus is in readiness to feed unprocessed containers into the rotor slots. To this end the operator presses and holds the "In" or "Load" push button 231 thereby energizing the shuttle driving motor 161 for operation in direction to move the shuttles and the ladders into the retort. As explained in connection with Fig. 4, as the ladder rack 54 advances into the retort doorway 65, for example, containers C advancing through the twister 147 pass beneath the star wheel 149 and roll down the inclined chute 128 into successively presented pockets 58 between the cross members 57 of the ladder.

In order that a continuous supply of containers may be maintained in the twister 147 to fill the ladder pockets, the container feeding conveyer 27 is operated at a higher speed during loading, in the order of about five times its speed when storing containers, to synchronize it with the rate of movement of the ladder rack. This is effected by driving the feeding conveyers 27 from the shuttle feeding motor 161 with the clutch 151 overrunning to permit more rapid rotation of the shaft 143. For this purpose, the motor 161 is provided with a second drive connection including a sprocket 265 from which a chain 266 transmits power to a sprocket 267 on the opposite end of the shaft 143 from the sprocket 150, as shown in Fig. 9. The sprocket 267 is operatively connected to drive the shaft 143 by means of an overrunning clutch 268 so arranged that the shaft 143 may turn within the clutch 268 when the sprocket 267 is stationary or is turning in reverse direction. Accordingly, the overrunning clutch 268 effects high speed driving of the conveyer 27 only when the shuttle feeding motor 161 is operating in the "In" or "Load" direction.

As the ladder 54 and the shuttles 155 advance along the respective trackways 121 and 122, they pass the intermediate control valves 237 and 238 thereby permitting the valves to move to the exhaust or bleeding position shown in Fig. 15. This permits air to escape through the conduits 255 and 256 from the actuating cylinders 257 thereby permitting the piston rods 258 to to move downward swinging the levers 259 down to the position in which the pawls 260 engage the locking abutments 261 of the star wheels 149 thereby locking the star wheels and preventing the further feeding of unprocessed containers onto the inclined chute 128. The valves 237 and 238 are so positioned on the frames 124 of the trackways that they are released by movement of the shuttles past them just after the last container, in this instance, the nineteenth container, has passed beneath the star wheel 149 for feeding into the last pocket 58 of the ladder 54. By this arrangement, feeding of the containers into each ladder is terminated at precisely the right point to insure that the ladder is filled, but to prevent any subsequent feeding of unprocessed containers until after the rotor has been indexed and the next row of previously processed containers unloaded. Each ladder 54 then continues to move into the rotor slot with a full load of containers until it strikes the inner end of the rotor and comes to rest with the belt 165 slipping as previously explained. The operator then releases the "In" push button 231 whereupon the shuttle feeding motor 161 comes to rest thereby stopping the fast conveyer driving sprocket 265, whereupon the overrunning clutch 151 resumes driving of the shaft 143 at slow speed with the clutch 268 then overrunning. The conveyer 27 then continues operating at the slow speed to accumulate another row of nineteen containers for subsequent feeding into the next trackway 51 of the rotor 41.

With the two loaded container moving ladder racks 54 in position within the trackways 51 of the rotor 41, the next operation is to release the shuttles 155 from the ladders 54. As best shown in Fig. 10, the ladder engaging hook 156 of each shuttle 155 is carried by an arm 271 that extends outward from an actuating shaft 272 that is rotatably mounted within a hollow side piece 273 constituting one side rail of the shuttle 155. The shaft 272 projects at the other end of the shuttle and is provided with a cam plate 274 by means of which it may be turned to lift the hook 156 out of engagement with the cross member 57. As best shown in Figs. 7 and 8, the cam member 274 may be engaged and lifted by an actuating shoe 275 against the action of a spring 276 to release the hook 156. For this purpose there is provided at each of the retorts 21 and 22 an uncoupling lever 278, the two levers being mounted at the inner sides of the loading trackways between the two retorts as shown in Fig. 1 in order that the operator may control both retort loading mechanisms from a central position between them.

As shown in Fig. 7, each uncoupling lever 278 is pivotally mounted on a side rail 124 of the loading trackway and has pivotally connected to it an actuating rod 279 that extends across the trackway and is connected with a bar 280 that is slidably mounted on the top of the other channel side member 124. The actuating shoe 275 is carried on the lower end of a curved lever 281 that is pivoted at its midpoint on the channel 124 and is pivotally connected at its top with the bar 280. Thus, when the uncoupling lever 278 is moved from its solid line position to the dot dash line position, the curved lever 281 moves the actuating shoe 275 upward to the dot dash line position in which it engages the cam 274 to turn it and the actuating shaft 272 counterclockwise against the spring 276 thereby lifting the hook 156 out of engagement with the ladder cross member 57. In order that the shuttles in both the trackways 121 and 122 may be actuated simultaneously, the bar 280 has pivotally connected to it an actuating rod 283 that extends across to the other trackway and is pivotally connected to a curved lever arm 284 pivotally mounted on the opposite side frame 124 of the other trackway and carrying an actuating shoe 285. As appears in Fig. 7, the curved lever 284 and the actuating shoe 285 are reversed with respect to the lever 281 and shoe 275 of the inside trackway since the shuttles 155 in the two trackways are of opposite hand to accommodate the two ladders 54 which are in reversed position. Thus, by actuating the uncoupling lever 278, the hooks 156 of both shuttles in the two trackways may be released simultaneously to disengage both shuttles from the ladders in the rotor slots.

As shown in Fig. 7 and indicated diagrammatically in Fig. 15, when the uncoupling lever 278 is moved to uncoupling position, it engages and closes a switch 287. The switch 287 is connected in parallel relationship with the "Out" push button 235 and operates to close a circuit leading from the energized conductor 232 through a conductor 288, the closed switch 287 and a conductor 289 that connects with the "Out" control winding 236 of the shuttle actuating motor 161. This causes the shuttles 155 to move outward in a retracting action which is limited to a distance of only about three inches but is sufficiently far to clear the shuttles from the inner edges of the doorways 65 and 66. As best shown in Figs. 7 and 8 and represented diagrammatically in Fig. 15, outward movement of the shuttle is limited by an upwardly projecting stop lug 291 on the unlatching shoes 275 and 285, the arrangement being such that the lug 291 is raised into the path of movement of the cam 274 and engages it to stop further retracting movement of the shuttle. This results, as previously explained, in causing the belt 165 to slip until the uncoupling lever 278 is released thereby opening the motor energizing switch 287 to stop the motor 161.

As the shuttle 155 is retracted with the cam 274 in elevated position the raised cam engages and closes a switch 293 at the end of the stroke which establishes a circuit from the energized conductor 232 through a conductor 294, the closed switch 293 and a conductor 295 to a solenoid valve 296 which is connected by a conductor 297 with the return line conductor L1. When the solenoid valve 296 is thus energized, it moves to open position to release pressure from the cylinder 216 thereby causing the valve piston 217 to move to the left. This results in the air pressure line 219 being disconnected from the conduit 221 leading to the bottom of the indexing cylinder 180 and connected with a conduit 298 leading to the upper end of the cylinder. Pressure in the upper end of the cylinder 180 causes the indexing piston rod 179 to move downward thereby retracting the indexing pin 168 from the index wheel 48 and swinging the indexing arm 171 down to the position shown in Fig. 13. When the piston rod 179 arrives at the lower position, the cam 223 thereon engages and opens the valve 214 thereby releasing pressure from the right end of the cylinder 211 to cause the valve piston 217 to move to the right and reverse the connections. This permits air under pressure from the source 219 to again flow into the conduit 221 leading to the lower end of the cylinder 180 thereby moving the piston rod 179 upward to effect the indexing operation as previously explained.

The switch 293 when closed also completes a circuit from the energized conductor 294 through the closed switch 293 and a conductor 302 that leads to a solenoid valve 303 connected by a conductor 304 to the return line conductor L1. When the solenoid valve 303 is energized it opens to relieve pressure from the left end of a cylinder 305 to permit leftward movement of the valve piston 244. This results in effecting a connection from the pressure source 246 into a conduit 306 leading to the right end of the chute actuating cylinder 136 associated with the trackway 121. A branch conduit 307 leads from the conduit 306 to the right end of the cylinder 136 associated with the trackway 122. At the same time the valve piston 244 connects the conduit 248 to an exhaust port 308 to relieve pressure from the left ends of the cylinders 136. This results in movement of the piston rods 135 to the left thereby tilting the chutes 128 downward to the container discharging position shown in Fig. 3. As shown, one of the chutes 128 engages and opens a switch 311 in the conductor 294 which opens the indexing control circuit and prevents further indexing of the rotor until after the processed containers have been discharged from the rotor slots then in alignment with the doorways 65 and 66.

With the rotor 41 indexed and the inclined chutes 128 moved down to discharging position, the apparatus is in condition to unload and reload the second pair of container trackways 51. As previously explained, the operator now presses the "In" push button switch 231 to advance the shuttles 155 and couple them to the ladders 54. The "Out" push button switch 235 is then pressed and held closed until the ladders are completely retracted and the containers discharged down the chutes 128. During this operation the star wheel 149 is held in locked position to prevent the escape of unprocessed containers into the discharge chute. At the end of the discharge stroke each chute 128 is moved to the upper position as previously explained and the counter 190 is thereby operated to indicate the count of "two" for the second pair of trackways. The "In" push button 231 is then held closed while the ladders 54 are fed into the rotor slots with a new charge of unprocessed containers. The uncoupling lever 278 is then operated again to uncouple the shuttles and index the rotor to bring the third pair of slots into alignment with the doorways.

This process is repeated until the eighth pair of container receiving trackways 51 are indexed into alignment with the doorways 65 and 66. As the eighth pair of ladders are withdrawn to the outer end of the loading trackways the valves 239 and 240 are opened causing the inclined chutes 128 to be moved to their upper positions as previously explained. The linkage 191 also operates as before to advance the counter 190 to the "eight" count position. At this position a cam 315 on the counter 190 presents a notch 316 which permits a switch 317 to move up thereby opening contacts 193 and closing contacts 318. With contacts 193 open the circuit leading through conductor 194 to the cross conveyor motor 199 and the feed conveyor motor 154 is deenergized thereby stopping these conveyors. This prevents further delivery of containers to the conveyors 27, but each conveyor 27 has already received a full charge of nineteen containers that are available for feeding into the last two slots of the rotor. By this arrangement there will be no containers left on the feeding conveyors 27 at the end of the loading operation. With the switch contacts 193 open, the conductor 205 leading to the indexing mechanism is also deenergized which deenergizes the solenoid 206 and closes the valve 207 to prevent the exhaust of air pressure when the valve 214 is opened.

The closed contacts 318 of the switch 317 then energize a conductor 319 that leads to the open switch contacts 225, the conductor 226, the push button switch 227 and the conductor 228 leading to the process control system. The operator then closes the "In" push button switch 231 to feed the last row of nineteen containers into the last two slots of the rotor 41. As previously explained, this energizes the shuttle driving motor 161 in direction to effect inward feeding movement of the shuttles 155 and the ladders 54. The motor 161 also operates through the chain 266 and overrunning clutch 268 to drive the conveyor 27 which had previously been stopped with the load of nineteen cans for filling the last rotor slots. When the ladders 54 have been fed into the rotor, the push button switch 231 is released thereby stopping the motor 161. This also stops the conveyors 27 which now have been emptied of containers. The uncoupling lever 278 is then actuated to uncouple the hooks 156 from the ladders 54. This also closes the switch 287 to energize the motor 161 in direction to withdraw the shuttles 155 out of the path of the retort doors 85 and 86. As previously explained, this results in closing the control switch 293 thereby energizing the indexing circuit conductor 295 leading to the solenoid valve 296 and thereby shifting the valve piston 217 to the position for applying pressure through the conduit 298 to the upper end of the indexing cylinder 180. This results in moving the indexing piston rod 179 downward to disengage it from and free the indexing disc 48. However, since the valve 207 is now closed, when the cam 223 on the piston rod 179 engages and opens the valve 214, the pressure does not escape from the conduit 212 and the cylinder 211. Therefore, the valve piston 217 remains in the same position with the air pressure still in the upper end of the cylinder 180 and holding the piston rod 179 down and out of contact with the indexing wheel 48 to permit rotation thereof without interference from the indexing apparatus during processing of the batch of containers.

With the piston rod 179 held down, the switch 224 moves to the position in which the contacts 225 are closed and the contacts 229 are open. With the contacts 229 open, the conductor 232 is deenergized thereby deenergizing the shuttle driving motor 161 and preventing movement of the shuttles 155 from their retracted position. This also deenergizes the conductor 294 thereby deenergizing the chute tilting and rotor indexing control circuits leading from the switch 293. Any further actuation of the loading control switches then has no effect upon the loading or indexing apparatus. This obviates the possibility of inadvertently unloading any unprocessed containers.

With the shuttles 155 retracted and their control mechanism deenergized after loading the last two trackways, the retort doors 85 and 86 may be closed by moving the valve lever 102 to the right as shown in Fig. 6 and then sealed in closed position by moving the valve lever 114 also to the right as previously explained.

The retort 21 is now in condition for processing the batch of containers C that have been loaded in the rotor 41, by subjecting them to the influence of heating steam while the rotor is rotating. The processing cycle is fully automatic and may be started by the operator by closing the processing push button control switch 227 to complete the processing control circuit from the line conductor L2 through the closed counter switch contacts 318, the conductor 319, the closed indexing switch contacts 225, the conductor 226 and the closed push button switch 227 to the conductor 228 leading to the processing control circuit. When the processing control circuit is thus energized, the rotor driving motor 47 is energized to rotate the rotor 41 as fully explained in my Patent No. 2,816,841. As previously mentioned, energization of the motor 47 results in opening the relay 195 which prevents energization of the indexing control circuit thereby obviating the possibility of engaging the indexing pawl 167 with the index plate 48 while it is rotating during processing. This also prevents energization of the cross conveyor motor control winding 198 and the feed conveyer motor 154 of the retort 21. While the retort 21 is processing its load of material, the other retort 22 completes its processing cycle and stops automatically. It then may be unloaded and reloaded in a manner similar to that just described. When the loading of retort 22 begins, its counter 190 is reset to "zero" position and a second control winding 320 of the cross conveyer motor 199 is energized to cause the cross conveyer motor to rotate in the reverse direction whereupon the cross conveyers 25 and 26 will be operated in the opposite direction to deliver containers to the feeding conveyers 27 of the retort 22.

With the two retorts 21 and 22 operating alternately as described, it is necessary that each retort be provided with a full set of processing control instruments as set forth in my copending application. However, under some circumstances it may be desirable to operate a plurality of retorts in such a manner that processing occurs simultaneously in them. In this event, a pair of retorts 321 and 322 may be arranged as shown in Fig. 2 with their loading ends extending in opposite directions in order that both retorts may be loaded simultaneously from separate container sources. In this event, it is possible to simplify the processing control system by utilizing only a single set of controlling instruments represented by the recorder controllers 324 and 325 shown in the drawing. To accomplish this, the two retorts 321 and 322 are interconnected by a relatively large pipe or conduit 327 of sufficient diameter to insure that the pressure and temperature conditions will be substantially the same in both retorts. The controlling instruments 324 and 325 are then preferably connected as shown into the interconnecting conduit 327 by means of appropriate connecting leads 328 and 329.

Although the loading control system shown in Fig. 15 and explained in this application is arranged to be operated by an operator who presses the push button switches and actuates the control levers at appropriate times, it is apparent that the control system can be arranged to operate in a more fully automatic manner through the use of additional limit switches and interlocking relays whereby the successive phases of the loading cycle may be caused to follow one another automatically.

From the foregoing explanation of the exemplary agitating sterilizer loading mechanism and its accompanying control apparatus, it will be apparent that improved arrangements have been provided by this invention for effecting expeditious and efficient sterilization of food materials or like products confined in sealed containers. This is accomplished with least deleterious effect upon the quality of the products in the containers since after being sealed they are loaded into the sterilizing retort with a minimum of delay which tends to reduce the possibility of damage through exposure of the unsterilized contents to unfavorable temperature conditions.

Although specific examples of loading and controlling systems for sterilizing apparatus have been set forth in detail as illustrative of the present invention and to constitute a full disclosure of practical and useful embodiments thereof, it is to be understood that other arrangements of the apparatus and different control systems may be substituted by those familiar with the art without departing from the spirit and scope of the invention as defined in the subjoined claims.

The invention having now been fully described what is claimed is:

1. In apparatus for processing material sealed in individual containers, a housing constituting a pressure retort, a container carrying rotor mounted for rotation about a horizontal axis within said housing and presenting a series of longitudinal trackways about its periphery each adapted to receive a row of containers in side-by-side relationship and each having guide grooves along opposite sides thereof, cooperating container moving and spacing racks in the form of ladder-like frames having longitudinal side members arranged to slide in said guide grooves respectively and interconnected by a plurality of spaced transverse cross members arranged to form container receiving pockets, loading apparatus presenting two loading trackways disposed to be aligned respectively with two rotor trackways when said rotor trackways are positioned in a horizontal plane at opposite sides of said horizontal axis of rotation, power operated actuating apparatus associated with said loading trackways and adapted to withdraw two container moving racks simultaneously from diametrically opposed rotor trackways onto the corresponding loading trackways to maintain said rotor in balanced condition, a feeding trackway associated with each loading trackway and including a hinged section disposed when in horizontal position to guide containers horizontally into said rotor trackway, a feeding chute arranged to feed containers downward onto said feeding trackway for movement therealong by said container moving rack into the corresponding rotor trackway, means to move said hinged section of said feeding trackway to a downwardly inclined position for discharging containers that drop out of the pockets of said rack when it is withdrawn from a rotor trackway onto said loading trackway, and an interlocking control system arranged to prevent the discharge of containers fed into said rotor trackways until after they have been processed.

2. In apparatus for processing material in containers, a housing constituting a retort, a container carrying rotor mounted in said housing for rotation about a horizontal axis said rotor having a plurality of longitudinally disposed container receiving trackways spaced angularly about its periphery, container moving racks slidably received in each of said trackways, loading apparatus presenting two loading stations disposed to be aligned respectively with two rotor trackways when they are positioned in a horizontal plane at opposite sides of said horizontal axis of rotation, and power operated apparatus associated with said two loading stations and adapted to withdraw said container moving racks simultaneously from the two diametrically opposed rotor trackways and to return them thereinto in unloading and loading said container carrying rotor, the arrangement being such that through simultaneous action of said two loading stations said rotor is maintained in substantially balanced condition regardless of the extent to which it happens to be loaded with containers.

3. In control apparatus for a processing retort of the type arranged for end-over-end agitation during sterilizing including a power driven rotor provided with peripheral trackways for receiving rows of containers and having means for indexing the rotor during loading, power operated feeding means arranged to withdraw a row of previously sterilized containers from a trackway and to replace them with a row of unprocessed containers, control apparatus arranged to prevent the withdrawal of unprocessed containers newly fed into a trackway prior to indexing said rotor to present another trackway for loading, a counter, arranged to count the rows of containers fed into said rotor trackways, and control apparatus responsive to said counter and arranged to prevent further withdrawal of containers from said trackways when said counter has recorded a predetermined number of trackways filled with unprocessed containers until after said retort rotor has operated in the power driven sterilizing phase of the processing cycle to sterilize them, whereby containers fed into said rotor trackways are prevented from being discharged prior to being sterilized.

4. In apparatus for processing material sealed in cylindrical containers, a housing constituting a pressure retort, a rotor mounted for rotation about a horizontal axis within said housing said rotor presenting a series of longitudinal trackways each adapted to receive a row of cylindrical containers in side-by-side relationship with their axes disposed radially of said axis of rotation and each having guide grooves along the inner and outer sides thereof, and cooperating container handling racks in the form of ladder-like frames comprising side members arranged to slide in said guide grooves respectively and a plurality of spaced transverse cross members arranged to form container separating and propelling members, said ladder-like racks being disposed in radial planes and slidable into and out of said longitudinal rotor trackways for moving rows of containers into and out of said trackways in loading and unloading said rotor.

5. In a sterilizing apparatus for processing material in sealed containers by the method including end-over-end agitation, a housing constituting a retort, a container carrying rotor mounted in said retort for rotation about a horizontal axis, said rotor being provided with longitudinal peripherial container-receiving slots, ladder-like container moving racks slidably received in said slots, a feeding trackway including a hinged section disposed when in horizontal position to guide containers horizontally into said rotor slots, a feeding chute arranged to feed containers downwardly into said feeding trackway for movement therealong by one of said racks into one of said rotor slots, means to move said hinged section of said feeding trackway to a downwardly inclined position for discharging containers dropping from one of said racks as it is withdrawn from one of said rotor slots, and a discharge conveyer disposed to carry away containers discharged along said downwardly inclined trackway section.

6. In a food processing apparatus, a housing constituting a retort, a container carrying rotor mounted in said housing for rotation about a horizontal axis and presenting longitudinal slots angularly spaced about its periphery for receiving containers, a ladder-like container moving rack slidably received in each of said slots for feeding in or withdrawing a series of containers, mechanism arranged to withdraw one of said racks for discharging the containers therein and to replace said rack for feeding a new series of containers into said rotor slot, indexing apparatus arranged to index said rotor to present successive slots for receiving containers, and an interlock arrangement operative to prevent indexing movement of said rotor while a container rack is in process of being withdrawn from or fed into a slot in said rotor.

7. In a food processing apparatus, a rotor presenting longitudinal slots for receiving a series of containers of food for processing, a ladder-like container moving rack arranged to move a series of containers into one of said slots in said rotor, a feed chute arranged to feed containers into said ladder-like rack as it is moved into said slot, a discharge chute disposed to receive containers from said rack as it is moved out of said slot, and interlocking feeding mechanism arranged to prevent containers from entering said discharge chute while being fed into said rack and to prevent containers from feeding from said feed chute while containers are being discharged from said rack into said discharge chute.

8. In a food processing apparatus, a housing constituting a retort, a container carrying rotor mounted for rotation on a horizontal axis in said housing, said rotor presenting longitudinal slots for receiving rows of containers of food to be processed, feeding apparatus arranged to feed containers into and withdraw them from said slots, indexing apparatus arranged to index said rotor to present successive slots for unloading and loading, a counter operative to count said slots as they are loaded, and control apparatus responsive to said counter and operative when the last of said slots is loaded to prevent further indexing of said rotor or operation of said feeding apparatus, whereby to prevent containers of unprocessed food previously loaded into said slots of said rotor from being unloaded inadvertently prior to processing.

9. In apparatus for processing material sealed in individual containers, a housing constituting a pressure retort, a container carrying rotor mounted for rotation about a horizontal axis within said housing and presenting a series of longitudinal trackways about its periphery each adapted to receive a row of containers in side-by-side relationship and each having guide grooves along opposite sides thereof, cooperating container moving and spacing racks in the form of ladder-like frames having longitudinal side members arranged to slide in said guide grooves respectively and a plurality of spaced transverse cross members arranged to form container receiving pockets, loading apparatus presenting two loading trackways disposed to be aligned respectively with two rotor trackways when they are positioned in a horizontal plane at opposite sides of said horizontal axis of rotation, power operated actuating apparatus associated with said loading trackways and adapted to withdraw two container moving racks simultaneously from diametrically opposed rotor trackways onto the corresponding loading trackways to maintain said rotor in balanced condition, a feeding trackway associated with each loading trackway and including a hinged section disposed when in horizontal position to guide containers horizontally into said rotor trackway, a feeding chute arranged to feed containers downward onto said feeding trackway for movement therealong by said container moving rack into the corresponding rotor trackway, and means to move said hinged section of said feeding trackway to a downwardly inclined position for discharging containers that drop out of the pockets of said rack when it is withdrawn from a rotor trackway onto said loading trackway, the arrangement being such that by operating said loading apparatus in a manner to actuate the two container moving racks in each pair of diametrically opposed trackways at the same time said container carrying rotor may be maintained in substantially balanced condition.

10. In a material processing apparatus, a housing constituting a retort, a rotor mounted in said housing for rotation about a horizontal axis, said rotor being provided with longitudinal container receiving slots angularly spaced about its periphery, a pair of container receiving doorways in said housing disposed in a horizontal plane through the axis of said rotor in position to align respectively with diametrically disposed container receiving slots in said rotor when said rotor is turned to aligning position, and means to feed containers through said doorways simultaneously into both of said aligned diametrically disposed container receiving slots, the arrangement being such that successive pairs of said slots of said rotor may be aligned with said doorways and filled with containers progressively, whereby said rotor is maintained in a substantially balanced condition during the loading operation.

11. In a food processing apparatus, a retort arranged to confine containers of food to be processed and presenting a passageway for receiving and discharging containers, a discharging conveyor disposed to carry discharged containers away from said passageway, a gate arranged to close off said discharge conveyer to prevent the discharge of containers, a feeding conveyer disposed to deliver containers of food to be processed to said retort passageway when said discharge gate is closed, and an interlock operating when said discharge gate is open to prevent the delivery of containers from said feeding conveyer to said passageway, whereby containers of unprocessed food are prevented from inadvertently entering said discharging conveyer.

12. In a food processing apparatus, a housing constituting a retort, a container carrying rotor mounted for rotation within said housing, said rotor presenting container receiving channels extending longitudinally thereof and distributed about its periphery each channel being adapted to receive a row of containers disposed in side by side relationship and each channel being provided with opposed rack receiving grooves, a longitudinal rack member arranged to operate in each groove of each channel, container spacing and propelling cross members interconnecting said longitudinal rack members in each channel to form container spacing and moving racks, and means for propelling said racks along said grooves, whereby containers of food being processed may be moved into or discharged out of said channels in loading and unloading said container carrying rotor during a processing cycle.

13. In apparatus for processing material in cylindrical containers, a rotor presenting longitudinal container receiving trackways each having a pair of oppositely disposed guide grooves, a section of chain arranged to operate in each of said guide grooves respectively in a manner to constitute in each trackway a pair of spaced side members, transverse flights interconnecting said pair of spaced chain section side members in each trackway in a manner to form therewith individual container receiving pockets, and power operated mechanism operative to move said chain section side members and their interconnecting flights along said guide grooves into or out of each of said trackways for loading cylindrical containers carried in said pockets into said rotor or unloading them therefrom.

14. In a food processing apparatus, a housing constituting a retort, a container carrying rotor mounted for rotation on a horizontal axis in said housing, said rotor presenting longitudinal slots for receiving rows of containers of food to be processed, feeding apparatus arranged to feed containers into or withdraw them from said slots, indexing apparatus arranged to index said rotor to present successive slots for unloading and loading by said feeding apparatus, a counter operative to count said slots as they are loaded with containers of unprocessed food, and control apparatus responsive to said counter and operative when said counter indicates that the last of said slots has been loaded to prevent further indexing of said rotor or further operation of said feeding apparatus, whereby to prevent containers of unprocessed food newly loaded into said slots of said rotor from being unloaded inadvertently prior to processing.

15. In apparatus for processing material in containers, a plurality of retorts arranged in juxtaposed relationship and each arranged to receive a batch of containers to be processed, feeding conveyors arranged to feed containers to each of said retorts individually for loading a batch of containers thereinto, an accumulator disposed to accumulate containers for feeding into said retorts, means to deliver containers for processing to said accumulator, and means to feed containers from said accumulator to the said feeding conveyer for one or another of said retorts selectively, whereby a batch of containers to be processed may be loaded into one of said retorts while another of said retorts is operating to process a batch of containers previously loaded into it.

16. In apparatus for processing material sealed in containers, a housing constituting a pressure retort, a container carrying rotor mounted for rotation about a horizontal axis within said housing and presenting a series of longitudinal trackways about its periphery each trackway being adapted to receive a row of containers in side-by-side relationship and each having guide grooves along opposite sides thereof, cooperating container moving and spacing racks in the form of ladder-like frames having longitudinal side members arranged to slide in said guide grooves respectively and joined by a plurality of spaced transverse cross members arranged to form container receiving pockets, loading apparatus presenting two loading trackways disposed to be aligned respectively with two diametrically opposed rotor trackways when positioned in a horizontal axial plane and at opposite sides of said horizontal axis of rotation, actuating apparatus associated with said loading trackways and adapted to move two container moving racks simultaneously between said diametrically opposed rotor trackways and said loading trackways respectively in a manner to maintain said rotor in balanced condition, a feeding trackway associated with each loading trackway and including a hinged chute section disposed when in horizontal position to guide containers horizontally into said rotor trackway, a feeding chute arranged to feed containers downward onto said feeding trackway for movement therealong by said container moving rack in moving into the corresponding rotor trackway to load it with containers, and means for unloading said rotor trackways including apparatus to move said hinged chute sections of said feeding trackways to downwardly inclined positions for discharging containers that drop out of the pockets of said racks when they are withdrawn from said rotor trackways onto said loading trackways in unloading them, the arrangement being such that by operating said loading apparatus in a manner to actuate two container moving racks into or out of diametrically opposed trackways simultaneously, said container carrying rotor may be maintained in substantially balanced condition both during the loading operation and when rotating during the processing operation.

17. In a food processing apparatus, a housing constituting a retort, a container carrying rotor mounted in said housing for rotation about a horizontal axis and presenting longitudinal slots angularly spaced about its periphery for receiving containers, a ladder-like container moving rack slidably received in each of said slots to operate therein for feeding or withdrawing a series of containers, mechanism arranged to withdraw one of said racks for discharging a series of containers and to feed in said rack for feeding a series of containers into one of said rotor slots, indexing apparatus arranged to index said rotor to present successive slots for receiving containers, an interlock arrangement operative to prevent indexing movement of said rotor while a container moving rack is being withdrawn from or fed into a slot in said rotor and another interlock arrangement operative to prevent withdrawing of a container moving rack from a slot in said rotor while said rotor is being indexed to another container receiving position.

18. In apparatus for processing material in containers, a rotor arranged for carrying containers of material being processed said rotor being provided with a plurality of longitudinally disposed trackways adapted to receive rows of containers, container handling apparatus arranged to feed rows of containers into said trackways successively, indexing mechanism operatively connected to index said rotor for presenting said trackways to said container handling apparatus successively, and a counter mechanism operative in response to actuation of said apparatus and arranged to count the rows of containers as they are fed into said trackways, whereby the number of trackways that have been filled with rows of containers may be ascertained as the loading of said rotor proceeds.

19. In control apparatus for a processing retort of the end-over-end agitation type having a power driven rotor provided with peripheral trackways for receiving rows of containers, indexing means operatively arranged for indexing the rotor to present successive trackways for loading, power operated feeding means arranged to withdraw a row of processed containers from an indexed trackway and to replace them with a row of unprocessed containers, control apparatus operatively arranged to prevent the withdrawal of containers newly fed into a trackway prior to indexing said rotor to present another trackway to said feeding means, a counter arranged to count the rows of containers fed into said rotor trackways, control apparatus responsive to operation of said counter and arranged to prevent further withdrawal of containers from said trackways after said counter has recorded that a predetermined number of trackways have been filled with unprocessed containers, and control means operative only after said retort rotor has been operated by power in the sterilizing phase of the processing cycle to reactivate said counter controlled apparatus in a manner to permit withdrawal of the newly processed containers, the arrangement being such that containers in said rotor trackways cannot be withdrawn therefrom until after they have been sterilized.

References Cited in the file of this patent

UNITED STATES PATENTS

| | | |
|---|---|---|
| Re. 15,334 | Thompson | Apr. 11, 1922 |
| 805,184 | Baker | Nov. 21, 1905 |
| 823,523 | Gray | June 19, 1906 |
| 1,187,415 | Baxter | June 13, 1916 |
| 1,383,331 | Nordstrom | July 5, 1921 |
| 1,548,600 | Hansen | Aug. 4, 1925 |
| 2,081,446 | Brett | May 25, 1937 |
| 2,119,346 | Page et al. | May 31, 1938 |
| 2,176,811 | Galvin | Oct. 17, 1939 |
| 2,179,422 | Myers et al. | Nov. 7, 1939 |
| 2,330,967 | Griffin et al. | Oct. 5, 1943 |
| 2,548,524 | Eckhoff | Apr. 10, 1951 |
| 2,601,566 | Soderquist | June 24, 1952 |
| 2,629,312 | Davis | Feb. 24, 1953 |
| 2,639,144 | Long | May 19, 1953 |
| 2,701,047 | Schroeder | Feb. 1, 1955 |